United States Patent [19]

Pereny

[11] Patent Number: 5,023,497
[45] Date of Patent: Jun. 11, 1991

[54] MAGNETIC FORCE GENERATING SYSTEM

[76] Inventor: Franklin C. Pereny, 320 Lake Ave., Lancaster, N.Y. 14086

[21] Appl. No.: 129,522

[22] Filed: Dec. 7, 1987

[51] Int. Cl.$^5$ ............................................. H02K 33/10
[52] U.S. Cl. .................................... 310/36; 310/90.5; 318/127
[58] Field of Search ........................... 310/36, 12, 90.5; 318/114, 135, 127; 104/281, 283, 286; 505/903; 335/216

[56] References Cited

U.S. PATENT DOCUMENTS

| | | |
|---|---|---|
| 3,322,374 | 5/1967 | King, Jr. |
| 3,495,791 | 2/1970 | Drell et al. |
| 3,504,868 | 4/1970 | Engelberger |
| 3,904,942 | 9/1975 | Holtz ............................. 318/135 |
| 3,960,090 | 6/1976 | Maki et al. ..................... 318/135 |
| 4,307,668 | 12/1981 | Vinson ............................. 104/281 |
| 4,385,246 | 5/1983 | Schur et al. ..................... 310/10 |

FOREIGN PATENT DOCUMENTS 0168607 9/1984 Japan ................................. 335/243

OTHER PUBLICATIONS

Mayo, Jonathan L., "Superconductivity The Threshold of a New Technology", 1988, pp. 1-120.
Stadig, William P., "Superconductivity and the CPI", 11/88, pp. 21-31, Technology for Tomorrow.
"High Temperature Superconductivity", University of Houston, Texas Center for Superconductivity, Mar. 1989.
"New Device: High Temperature Superconducting Magnetic-Field Effect Transistor" from TcSUH News, Mar.-Jun. 1989, pp. 1-2.
"Ceramics Were Never Like This", U.S. News and World Report, 5/11/87, p. 67.
"Concise Science Dictionary", Oxford University Press, 1984, pp. 676-677.
Time Magazine, May 11, 1987, p. 65.

Primary Examiner—Steven L. Stephan
Assistant Examiner—Judson H. Jones
Attorney, Agent, or Firm—Fleit, Jacobson, Cohn, Price, Holman & Stern

[57] ABSTRACT

A cyclically varied magnetic field extending from a pole piece interacts with the repelling field of a superconductive member while conducting electrical current therethrough to generate a force transmitted to a frame which mounts the pole piece and the superconductive member in spaced relationship to each other forming a flux gap therebetween within which the magnetic fields interact. A power control unit regulates the variation of the magnetic field by means of an electromagnetic assembly mounted on the pole piece and controls cyclic interruption of current through the superconductive member.

3 Claims, 2 Drawing Sheets

MAGNETIC FORCE GENERATING SYSTEM

BACKGROUND OF THE INVENTION

This invention relates generally to the generation of a uni-directional force by magnetic field interaction.

The generation of uni-directional forces by the interaction of magnetic fields, for various purposes such as vehicle propulsion, is generally known as disclosed for example in U.S. Pat. Nos. 3,322,374, 3,495,791; and 3,504,868. The use of interacting magnetic fields to produce lift forces for gravitational load suspending purposes is also well known. The utilization of interacting magnetic fields has recently received attention because of technological advances in the development of superconductive materials. For example, it is now known that current circulated through, a superconductive material under superconductivity conditions will repel magnetic fields adjacent thereto, a phenomenon known as the "Meissner" effect. Such magnetic field repelling effect of current conducted through a superconductive material has been demonstrated by the suspension or levitation of a magnet positioned in the vicinity of a disk of superconductive material.

It is therefore an important object of the present invention to utilize the aforementioned repelling effect of current conducted through superconductive material to produce a uni-directional force capable of being utilized for various utilitarian purposes such as remote switch actuation, by way of example.

A further object in accordance with the foregoing object is to provide a system for generating a uni-directional force by control over the aforementioned repelling effect of superconductive material on magnetic fields.

SUMMARY OF THE INVENTION

In accordance with the present invention, electrical current is controllably circulated through a superconductive member mounted in spaced relationship to a magnetic pole piece to establish a magnetic flux gap within which magnetic field interaction occurs in order to generate a uni-directional force along the axis of the pole piece. Such force will be transmitted to a frame mounting the pole piece in spaced relationship to the superconductive member which in turn is spaced by an insulator from a relatively massive base in accordance with one embodiment of the invention.

The transmission of intermittent force accomplished by the invention is achieved through a force transmitting frame. A holding bracket is secured to the frame for fixedly mounting an annular member made of a lightweight material having a low magnetic reluctance property. A magnet or pole piece extends essentially through the annular member in alignment with an axis, and terminates at one axial end in a magnetic pole face. An electromagnetic coil assembly is mounted on the pole piece adjacent its axial end which is opposite to the one axial end, and is connected by an electric energizing cable to a power control unit for varying the magnetic field generated by the coil assembly.

The coil assembly interconnected by the pole piece to the annular member, is held in axially spaced alignment with a circular plate. The plate is made of a superconductive material spaced by an insulative spacer from a reference base. Electrical current is fed through the plate from the power control unit by cable terminals. When the electromagnetic coil assembly is energized, a magnetic field is generated, with magnetic flux emitted from the pole face into the flux gap located between the annular magnetic member and the superconductive plate.

The magnetic flux extends toward the plate without distortion when no current is conducted through the plate. The flux path lines are elastically deformed or displaced axially away from the plate by the magnetic field repelling action of electric current conducted through the superconductor plate. Such magnetic field repelling effect will accordingly produce a repelling force that is applied to the force transmitting frame through the holding bracket.

Since superconductive materials are limited in current capability, the current in the superconductive plate produces an auxiliary magnetic field interacting with the magnetic field of flux, an is of limited duration occurring cyclically under control of the power control unit. Thus, electrical power pulses applied are effective to produce pulsating forces transmitted to the force transmitting frame which results in an axial displacement of the plate relative to the base by deformation of the spacer.

The current conducted through the superconductive member is cyclically interrupted to limit the duration during which the magnetic field interaction occurs in order to effect pulsation of the generated force unidirectionally transmitted to the frame as aforementioned representing or associated with any utilitarian output loading. The magnetic field extending through the pole piece into the flux gap for interaction with the repelling effect of current conducted through the superconductive member under superconductivity condition is varied under control of an electromagnetic coil assembly connected to a power control unit through which the aforementioned cyclic interruption of current through the superconductive member is also controlled.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF THE PREFERRED EMBODIMENT

Figure 1:
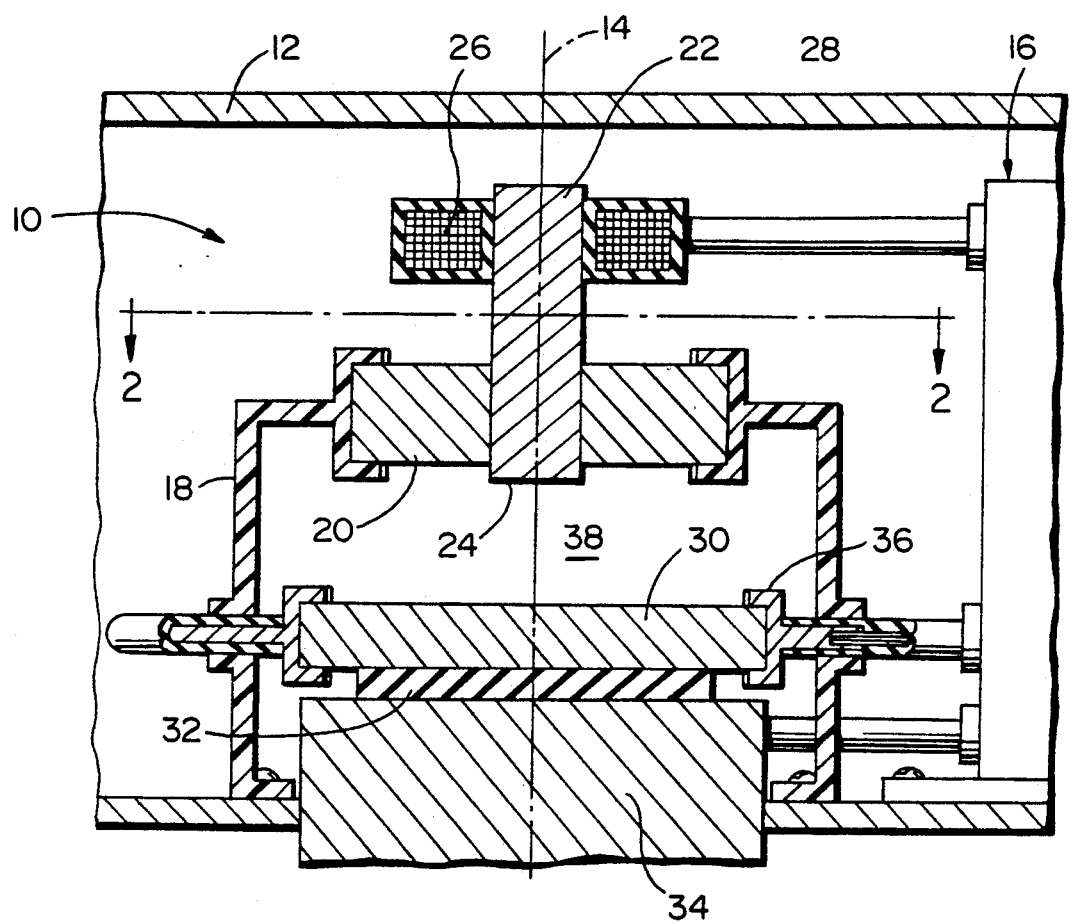
FIG. 1 is a partial side section view through apparatus constructed in accordance with one embodiment of the present invention.
Figure 2:
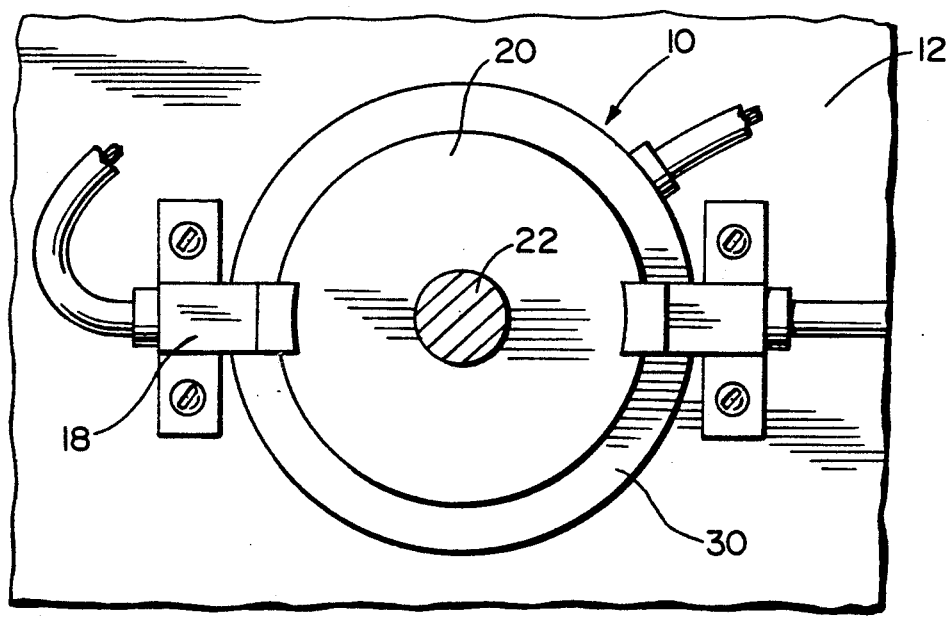
FIG. 2 is a top section view taken substantially through a plane indicated by section line 2—2 in FIG. 1.

Referring now to the drawings in detail, FIGS. 1 and 2 illustrate an application of the present invention in accordance with one embodiment in the form of an electromechanical energy interchange system 10 adapted to be mounted on a force transmitting frame 12 for applying thrust thereto in the direction of an axis 14. A power control unit 16 is associated with the system 10. The frame is preferably made of a non-magnetic and non-conductive metal such as aluminum.

In the illustrated embodiment, a holding bracket 18 is secured to the frame for fixedly mounting an annular member 20 made of a lightweight material having a low magnetic reluctance property. A magnet or pole piece 22 extends centrally through the annular member 20 in alignment with axis 14, and terminates at one axial end in a magnetic pole face 24. An electromagnetic coil assembly 26 is mounted on the pole piece 22 adjacent its axial end opposite pole face 24, and is connected by an electric energizing cable 28 to the power control unit 10 for varying the magnetic field generated.

The coil assembly 26 interconnected by pole piece 22 to the annular member 20, is held in axially spaced alignment with a circular plate 30. The plate 30 is made of a superconductive material spaced by an insulative spacer 32 from a relatively massive reference base 34. Electrical current is adapted to be fed through the plate 30 from the power control unit 16 cable terminals 36. When the electromagnetic coil assembly 26 is energized, a magnetic field is generated, characterized by magnetic flux emitted from pole face 24 into the flux gap 38 between the annular magnetic member 20 and the superconductive plate 30.

Figure 4A:
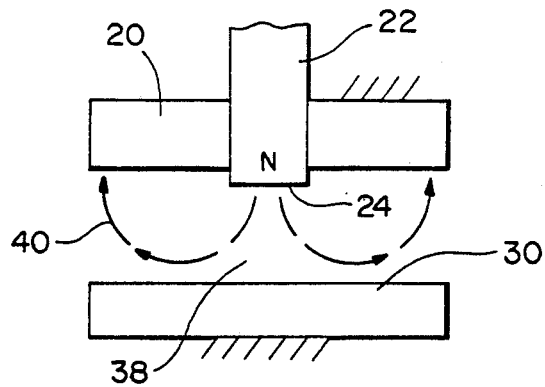
FIGS. 4A and 4B are side section diagrams of the apparatus shown in different operational phases.
Figure 4B:
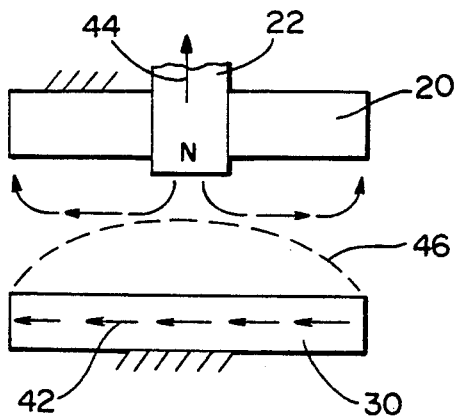

The magnetic flux represented by flux path lines 40 diagrammed in FIG. 4A, extends toward the plate 30 without distortion when no current is conducted through the plate 30. In FIG. 4B, the flux path 40 is elastically deformed or displaced axially away from the plate 30 by the magnetic field repelling action of electric current conducted through the superconductor plate 30 in accordance with a phenomenon presently known as the "Meissner" effect which may be established under superconductivity conditions as aforementioned, involving the use of suitable materials and maintenance of a low temperature environment as is well known in the art and set forth for example in U.S. Pat. No. 3,504,868 aforementioned. Such magnetic field repelling effect will accordingly produce a repelling force denoted by arrow 44 in FIG. 4B that is applied to the frame 12 through holding bracket 18.

Since superconductive materials are presently limited in current carrying capability, the current 42 in plate 30 (as diagrammed in FIG. 4B) producing an auxiliary magnetic field 46 interacting with the magnetic field of flux 40, is of limited duration occuring cyclically under control of the power control unit 16. Thus, electrical power pulses applied are effective to produce pulsating forces 44 transmitted to the frame 12 resulting in a small amount of axial displacement of the plate 30 relative to base 34 by deformation of spacer 32, insufficient, however, to absorb or dissipate the axial thrust of the forces 44. Such axial displacement of the plate 30 is utilized to control the application of the electrical power pulses through the power control unit 16, as will be described in detail hereinafter.

Figure 3:
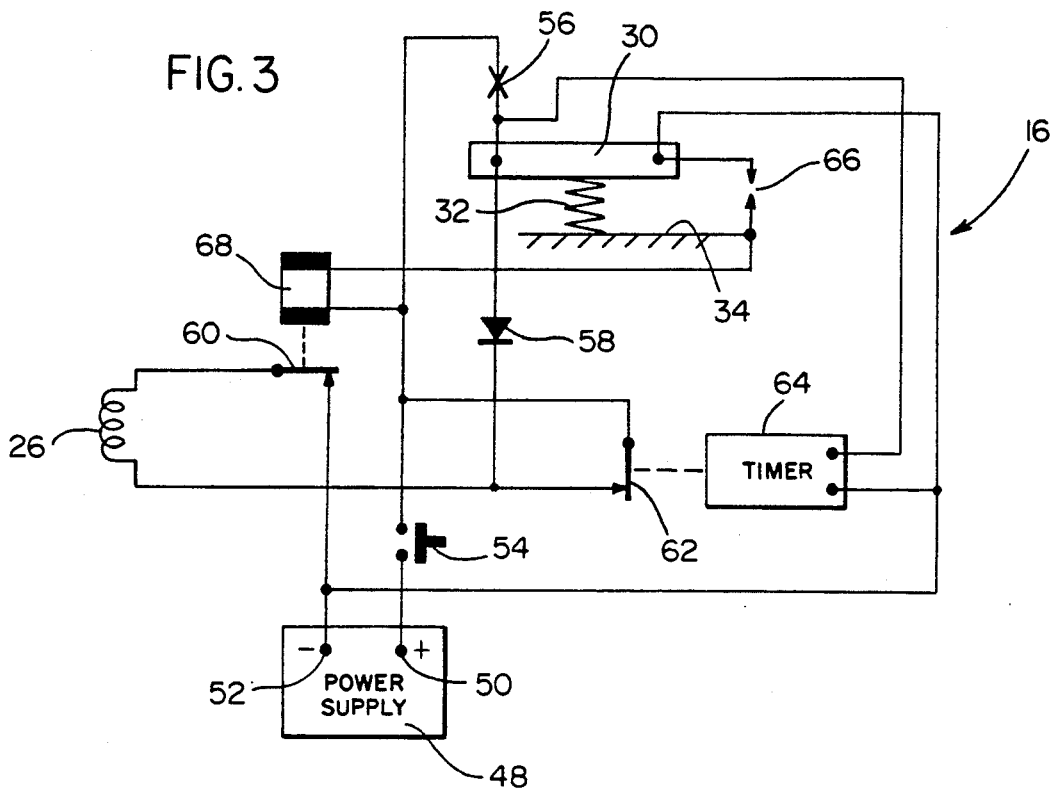
FIG. 3 is an electrical circuit diagram illustrating the system associated with the present invention.

FIG. 3 diagrams the power control system associated with unit 16 through which current is fed in a cyclic pulsating manner to the superconductive plate 30 from a suitable power supply 48 having positive and negative power terminals 50 and 52. The positive terminal 50 is connected through a power switch 54 to one side of the electromagnetic coil 26 in series with a normally closed switch 56 and diode 58 while the other side of coil 26 is connected to the negative terminal 52 of the power supply through a normally closed relay switch 60. The power switch 54 also connects the power supply across coil 26 through a timer switch 62 in series with relay switch 60. A timer circuit 64 control actuation of timer switch 62 and is connected across the power terminals 50 and 52 through the plate 30 in series with limit switch 56 upon closing of the power switch 54. The limit switch 56 is opened in response to displacement of the plate 30 as aforementioned, whereupon a second limit switch 66 is closed to connect relay coil 68 across the power supply terminals when the power switch 54 is closed.

In the initial phase condition of device 10 as depicted in FIG. 4A, coil 26 is energized through normally closed relay switch 60 and either limit switch 56 in series with diode 58 or timer switch 62, upon closing of power switch 54. The timer circuit 64 is then also energized through closed limit switch 56 to start a timing period. The limit switch 56 will also conduct current through the plate 30 until the plate 30 is displaced from its initial rest position by its magnetic repelling effect on the magnetic field generated by coil 26. Displacement of plate 30 opens limit switch 56 to terminate current flow through plate 30. Upon termination of the timing period of circuit 64, timer switch 62 is opened to de-energize the coil 26. The plate 30 will then return to its initial position closing limit switch 56 to initiate a new timing period. The timing period duration is selected to de-energize the coil 26 at an optimum instant in the operational cycle during which the displacement of plate 30 continues under momentum until limit switch 66 is closed. Closing of limit switch 66 energizes relay coil 68 to open relay switch 60 and prevent re-energization of coil 26 until plate 30 reaches its initial rest position.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A device for transmitting intermittent thrust, said device comprising:

a force transmitting frame for applying intermittent thrust, a holding member secured to said frame, an annular member fixedly mounted to said frame by said holding member, said annular member being made of a lightweight material having low magnetic reluctance property, a magnet extending through said annular member and terminating at one axial end in a magnetic pole face, an electromagnetic coil assembly mounted on said magnet adjacent an axial end opposite to said one axial end, power control means connected to said electromagnetic coil assembly for varying a generated magnetic field, a circular plate in axially spaced alignment with said coil assembly and said annular member, said circular plate being of a superconductive material, said power control means being connected to said plate for cyclically energizing said plate, a reference base, an insulative spacer for spacing said circular plate from said base so that upon energization of said coil assembly, a magnetic field is generated with magnetic flux emitted from said one axial end into a flux gap located between said annular member and said plate and upon simultaneous energization of said plate under superconductivity conditions, a magnetic field repelling effect will generate a repelling force applied to said frame through said holding member during limited duration time periods occurring cyclically under control of said power control means, resulting in axial displacement of said force transmitting frame.

2. A device for transmitting intermittent thrust as claimed in claim 1, wherein said power control means includes timing control means for cyclically limiting conduction of current through said plate.

3. A device for transmitting intermittent thrust as claimed in claim 2, wherein said power control means includes limit means for synchronizing energization of said coil assembly with periods during which current is conducted through said plate.

* * * * *